Figure 1:
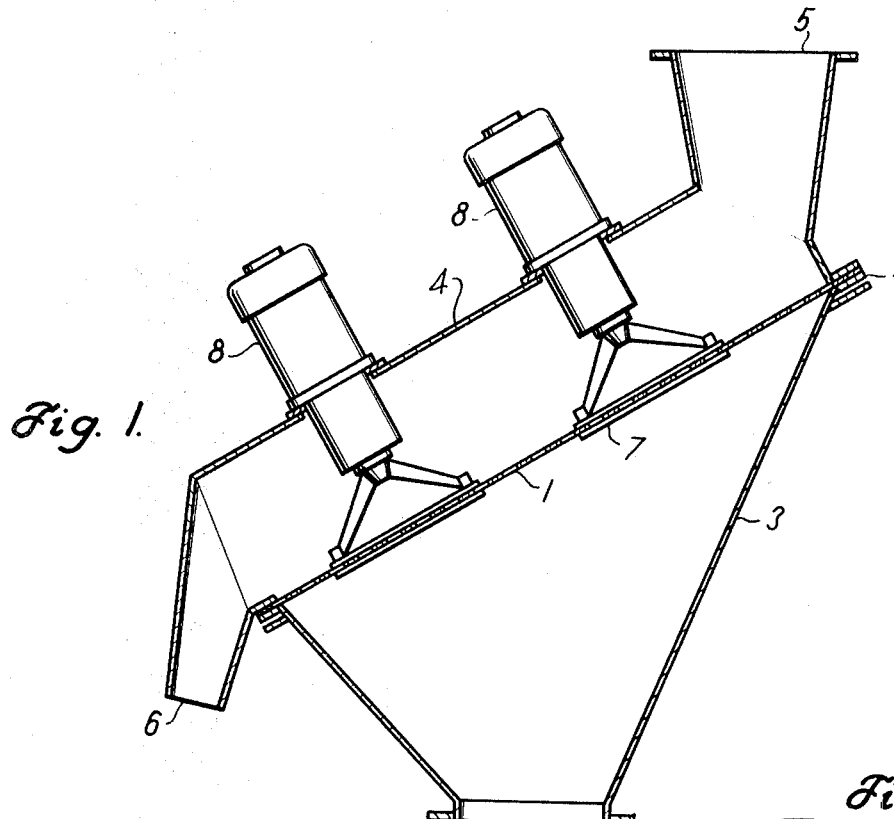

United States Patent

[11] 3,616,905

[72] Inventors Ladislav Kristek;
 Antonin Svizela; Ivo Hampl, all of Prepov, Czechoslovakia
[21] Appl. No. 802,567
[22] Filed Feb. 26, 1969
[45] Patented Nov. 2, 1971
[73] Assignee Prerovske strojirny, narodni podnik
 Prerov, Czechoslovakia
[32] Priority Feb. 26, 1968
[33] Czechoslovakia
[31] 1445/68

[54] ARRANGEMENT FOR CLASSIFYING OF LIQUID SUSPENSIONS AND OF SOLID MATERIALS
 5 Claims, 4 Drawing Figs.
[52] U.S. Cl. .................................................. 209/310,
 209/346, 209/368
[51] Int. Cl. .................................................... B07b 1/28
[50] Field of Search ........................................... 209/251,
 260, 269, 310, 357, 368, 347

[56] References Cited
 UNITED STATES PATENTS
| | | | |
|---|---|---|---|
| 1,397,341 | 11/1921 | Sturtevant .................... | 209/347 X |
| 1,804,115 | 5/1931 | Reynolds ..................... | 209/310 X |
| 1,904,032 | 4/1933 | Roberts ....................... | 209/347 |
| 2,880,871 | 4/1959 | Bruninghaus ................ | 209/310 |
| 3,325,007 | 6/1967 | Erlenstadt et al. ............ | 209/368 X |
| 3,024,912 | 3/1962 | Jakobs ........................ | 209/310 X |

Primary Examiner—Frank W. Lutter
Assistant Examiner—William Cuchlinski, Jr.
Attorney—Richard Low

ABSTRACT: Liquid suspensions and solid material are classified by means of a vibrating screen, to which vibrations are transmitted by at least one vibration exciter, engaging and encompassing the screen within a part of its surface area. Damping of oscillations due to the treated material resting on the screen is thus substantially reduced, resulting in an increased efficiency in classification.

PATENTED NOV 2 1971　　　　　　　　　　　3,616,905

INVENTORS
Ladislav Kristek, Antonin
Svízela, Ivo Hampl
By Richard Low Ag't

ARRANGEMENT FOR CLASSIFYING OF LIQUID SUSPENSIONS AND OF SOLID MATERIALS

This invention relates to vibrating screens for classifying liquid suspensions and solid material wherein a screen of predetermined mesh is directly vibrated to induce the selective passage of material therethrough known vibrating screens use electromagnetic vibrators as exciters or vibratory guides to transmit the required vibration to the screen. Conventionally, the excitor is connected to the screen at a given fixed narrow point so as not to interfere with the flow of material on the screen or through its mesh. Alternatively, the screen may be provided with additional structures having considerable masses. These structures are fixed to the surface of the screen and are resiliently supported by the screen frame. The vibrations are transmitted directly to the massed structures which in turn cause vibration of the screen. A drawback of such apparatus, particularly insofar as fine or very fine screens are used, is that substantial damping of the vibrations of the screen surface occurs due to the weight of the classified material and its action with the vibrating screen surface. The material being classified, interacts with the vibrating screen surface causing changes in frequency, timing and phase, as well as physical distortion of the screen itself. As a result, the life of the screen is considerably shortened and the weight of the material tends to damage and impair the fine screen mesh.

It is an object of this invention to provide a vibrating screen, which would eliminate these drawbacks and operate efficiently with the classified material resting on the screen even if the screen mesh is fine.

This object is achieved by transmitting vibrations to the screen by means of vibration exciters or drivers engaging the screen over a large part of its surface area. By the application of these vibration exciters the defects caused by damping of vibrations of the screen surface due to the weight of the classified material is reduced, resulting in an increased efficiency and in improved operating parameters of the machine.

Figure 2:
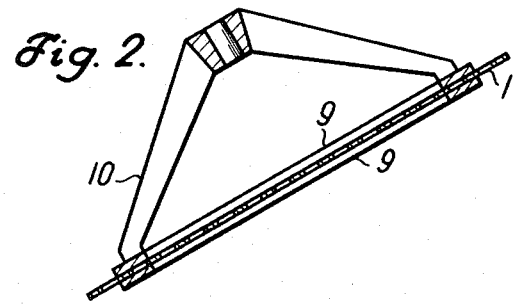
Figure 3:
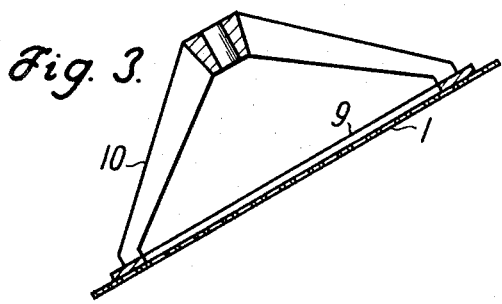
Figure 4:
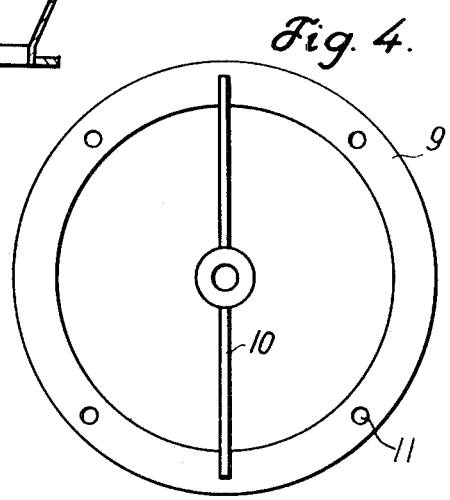

An embodiment of the present invention is shown in the accompanying drawing, where FIG. 1 is a sectional elevation of a classifying machine, FIG. 2 is a sectional elevation of a vibration exciter fixed to the screen, FIG. 3 a sectional elevation of a vibration exciter pressed against the screen and FIG. 4 is a top view of a vibration exciter of a part of the screen surface.

With reference to FIG. 1 an inclined screen 1 is clamped in a frame 2 fixed to the edge of the upper border of a discharge hopper 3. The discharge hopper 3 and the screen 1 is covered by a cover plate 4 provided at its upper end with a supply hopper 5 and at its lower end with a discharge outlet 6. One or more vibratory exciters 7 contiguous with and covering a part of the surface area of the screen 1 is either fixed to or pressed against the screen surface. Each exciter 7 comprises one or more small frames 9 having, as seen in FIG. 4, the shape of an annular ring having a diametric outwardly extending yoke 10. Associated with each exciter is a generator 8 which produces vibrations subsequently transmitted through the exciter in a direction perpendicular to the screen 1. The generators are connected to the exciters via the yokes 10 and are fixedly mounted to the cover 4 of the apparatus. The exciter may be fixed to the screen by suitable bolts or fastening means extending through holes 11 or it may be otherwise adhered to the screen to form a contiguous common joint with it. As seen in FIG. 2, the exciter is fixed to the screen and includes a second annular ring portion 9' placed beneath the surface of the screen 1. The annular ring portion 9' is circumferentially secured, through the screen 1, to the annular ring portion 9 of the exciter by the mentioned bolt or other suitable fastening means. The lower ring portion 9' need not have a diametric yoke. Alternatively, as seen in FIG. 3, the exciter 7 may be of a simple version, comprising the annular ring 9 and yoke 10, the annular ring being merely pressed or contiguously adhered against the upper surface of the screen so that conjoint vibration is elected.

As seen in FIG. 1, a plurality of generators may be used which are spacedly arranged over the area of the screen. Each generator has an associated exciter connected by its yoke 10 to it. The individual generators can be of commonly known design, such as electric motors, producing an oscillating action on an extending shaft. The individual generators may produce vibrations of differing cycles per unit time. They may have different sequence, phase, and amplitude displacement and may be combined in selective alternative arrangements to provide any vibration or combination of vibrations for the screen. The individual generators may be synchronized in or out of phase with respect to time, amplitude displacement, or frequency for example.

The treated material is supplied via the supply hopper 5 to the screen 1 and is classified by the intensively vibrating screen 1 so that the material passing through the screen, is collected in the discharge hopper 3, while the material remaining on top of the screen proceeds along the inclined surface of the screen towards the discharge outlet 6.

The very intensive vibration of the screen surface is caused by oscillating the exciter perpendicularly to the screen surface. Since the exciter 7 is either fixed to or pressed against a large part of the surface area of the screen, the exciter supports and vibrates the screen 1 over a substantial portion of the surface. Because of the annular ring portion and the extending yoke, the exciter does not interfere with the flow of material either over or through the screen mesh.

The reduction of damping achieved by the arrangement according to this invention since the exciter ring 9 in either the embodiment of FIG. 2 or FIG. 3 rests contiguously upon the screen and encompasses a large area of the screen, it helps to support the screen against damping effects or unwanted movement by the material being classified as such material falls to the hopper 5 of the discharge 6.

We claim:

1. Apparatus for classifying liquid-solid suspensions comprising a frame, a screen mounted substantially about its periphery to said frame, means for supplying material to be classified to one surface to said screen, means for receiving material passing through said screen, means for discharging the material not passing through said screen, at least one generator located on one side of said screen for producing motion perpendicularly to the surface of said screen, an exciter for transmitting said motion to said screen, said exciter comprising an annular ring portion contiguous with the surface of said screen having a diametric yoke extending outwardly therefrom, said yoke comprising spaced members to allow passage of liquid-solid suspension therethrough and connected to said generator substantially the entire surface of said screen within said annular ring being exposed to said suspension and the sole contact between said exciter and said screen being at said annular ring.

2. The apparatus according to claim 1, wherein said annular ring is secured to the surface of said screen.

3. The apparatus according to claim 1, including a second annular ring contiguous with the opposite surface of said screen, said second annular ring being aligned with and secured about its circumference through said screen with the annular ring of said exciter.

4. The apparatus according to claim 1 including a plurality of associated generators and exciters spacedly arranged within the area of said screen each of said generators being selectively operable to provide a predetermined vibration to said screen.

5. The apparatus according to claim 1, wherein said annular ring extends over a substantial radius on the surface of said screen.